(12) United States Patent
Cornett et al.

(10) Patent No.: US 11,831,742 B2
(45) Date of Patent: Nov. 28, 2023

(54) SEMI-FLEXIBLE PACKET COALESCING CONTROL PATH

(71) Applicant: Intel Corporation, Round Rock, TX (US)

(72) Inventors: Linden Cornett, Portland, OR (US); Anjali Singhai Jain, Portland, OR (US); Noam Elati, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 837 days.

(21) Appl. No.: 16/712,617

(22) Filed: Dec. 12, 2019

(65) Prior Publication Data

US 2020/0120190 A1    Apr. 16, 2020

(51) Int. Cl.
| | |
|---|---|
| *H04L 69/166* | (2022.01) |
| *H04L 45/00* | (2022.01) |
| *H04L 45/64* | (2022.01) |
| *H04L 69/22* | (2022.01) |
| *G06F 9/455* | (2018.01) |
| *H04L 67/10* | (2022.01) |
| *H04L 69/16* | (2022.01) |

(52) U.S. Cl.
CPC ............ *H04L 69/166* (2013.01); *H04L 45/38* (2013.01); *H04L 45/64* (2013.01); *H04L 69/22* (2013.01)

(58) Field of Classification Search
CPC ....... H04L 69/166; H04L 45/38; H04L 45/64; H04L 69/22

USPC ......................................................... 370/474
See application file for complete search history.

(56) References Cited

U.S. PATENT DOCUMENTS

| | | | | |
|---|---|---|---|---|
| 2007/0014246 A1* | 1/2007 | Aloni | .............. | H04L 47/10 370/254 |
| 2013/0205037 A1* | 8/2013 | Biswas | ............. | H04L 47/193 709/232 |

* cited by examiner

*Primary Examiner* — Kwang B Yao
*Assistant Examiner* — Xuan Lu
(74) *Attorney, Agent, or Firm* — Compass IP Law PC

(57) ABSTRACT

Methods, apparatus, and systems for implementing a semi-flexible Receive Segment Coalescing (RSC) control path. Logic for evaluating packet coalescing open flow criteria and close flow criteria are implemented in hardware on a network device that receives packets from one or more networks. packet coalescing open profiles and packet coalescing close profiles are also stored on the network device, wherein each packet coalescing open profile defines a set of packet coalescing open flow criteria to be applied for that packet coalescing open profile and each packet coalescing close profile defines a set of packet coalescing close flow criteria to be applied for that packet coalescing open profile. packet coalescing open flow and close flow profiles are then assigned to packet coalescing-enabled receive queues on the network device and corresponding open and flow criteria are used to perform packet coalescing-related processing of packets in the receive queues. The scheme supports hardware-based packet coalescing packet processing while providing flexibility in meeting the requirements of different operating systems and future usage models on a single network device.

30 Claims, 10 Drawing Sheets

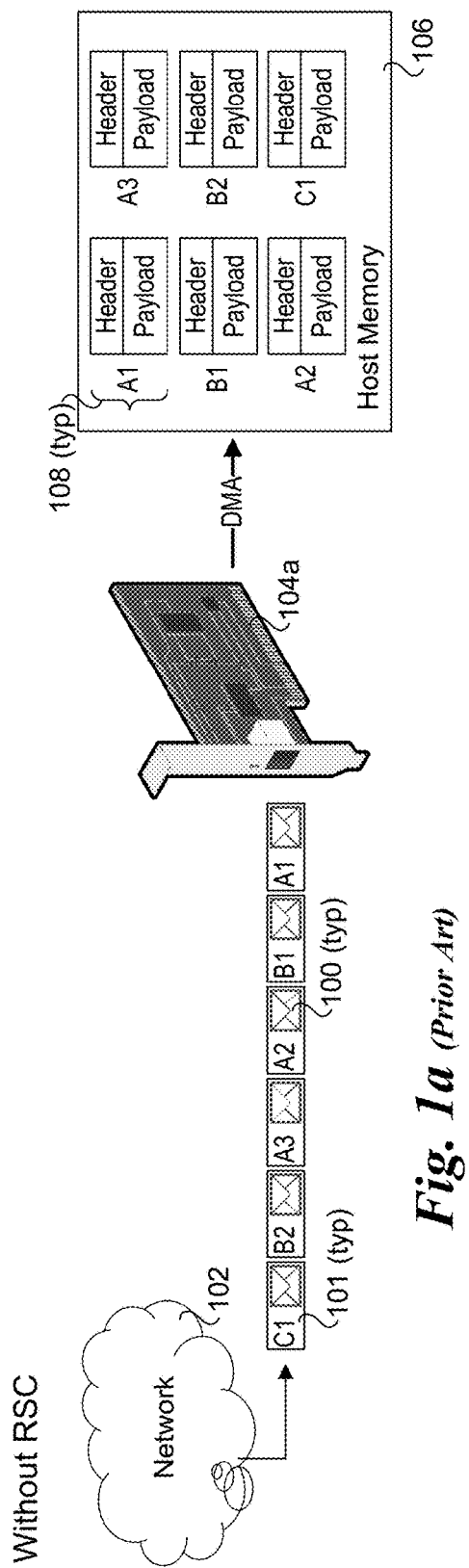
Fig. 1a *(Prior Art)*
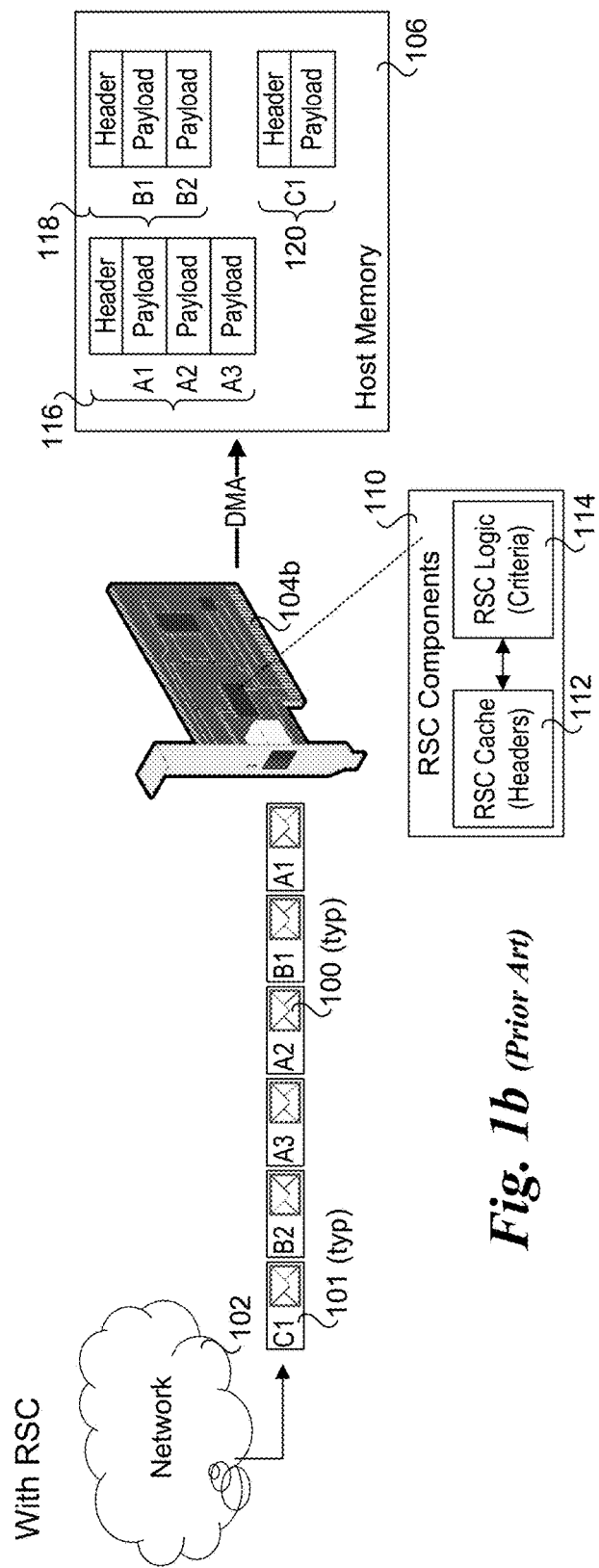
Fig. 1b *(Prior Art)*

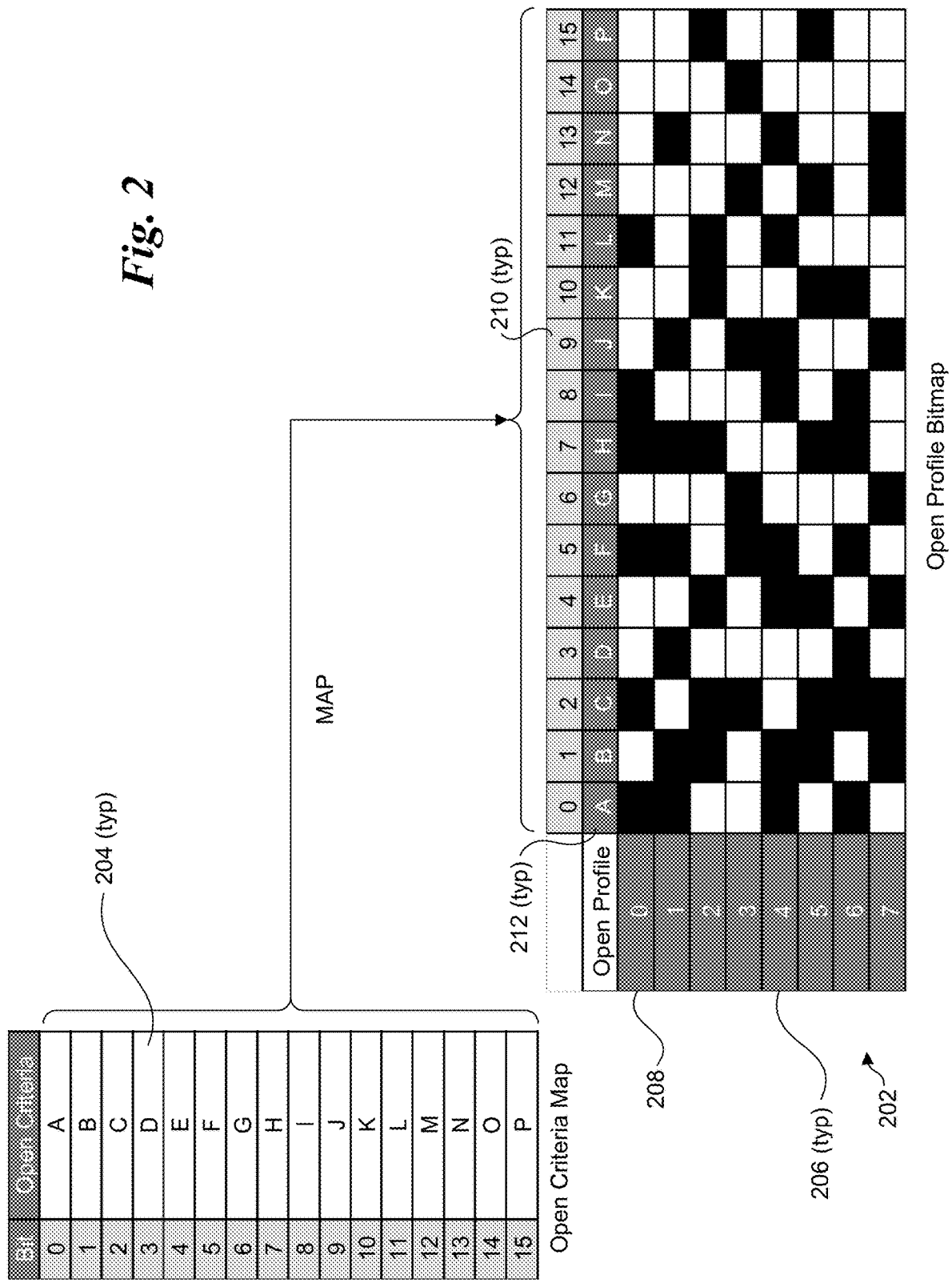

SEMI-FLEXIBLE PACKET COALESCING CONTROL PATH

BACKGROUND INFORMATION

During the past decade, there has been tremendous growth in the usage of so-called "cloud-hosted" services. Examples of such services include e-mail services provided by Microsoft (Hotmail/Outlook online), Google (Gmail) and Yahoo (Yahoo mail), productivity applications such as Microsoft Office 365 and Google Docs, and Web service platforms such as Amazon Web Services (AWS) and Elastic Compute Cloud (EC2) and Microsoft Azure. Cloud-hosted services are typically implemented using data centers that have a very large number of compute resources, implemented in racks of various types of servers, such as blade servers filled with server blades and/or modules and other types of server configurations (e.g., 1 U, 2 U, and 4 U servers).

Another aspect of today's data center is the use of high-speed links to connect the servers with one another and to connect servers to memory and storage resources and external networks. The high-speed links currently include 100 Gigabit per second (Gb/s) links, such as 100 Gigabit Ethernet (100 GbE) defined in the 802.3bj-2014 Standard and 400 Gb/s links, such as 400 GbE defined by the 802.3bs-2017 Standard. Other types of interconnects use in today's servers and data centers also operate at 100 Gb/s or greater.

In parallel with increases in network bandwidth, techniques have been developed to support higher traffic bandwidths in the network device hardware, such as Ethernet Network Interface Controllers or Cards (NICs). These techniques include mechanisms for offloading operations historically performed by the networking stack in an operating system (OS) kernel, such as flow classification and packet identification and TCP offload engines (TOE). TOE offloads the TCP/IP processing from the host CPU. Other improvements involve mechanisms in the NICs that are performed in conjunction with the OS kernel, such as receive side scaling (RSS), which distributes NIC interrupts across multiple CPU or CPU cores, and interrupt moderation, which reduces the number of interrupts generated by the NIC. Support for jumbo frames may also be implemented, which reduce TCP/IP stack processing time. However, jumbo frames require support for all intermediate routers and switches in addition to endpoint machines, which limits it use.

Another approach is Receive Segment Coalescing (RSC), also known as Receive Side Coalescing, which more generally is a scheme for packet coalescing. RSC allows a NIC or a kernel component to identify TCP/IP packets that belong to the same connection (e.g., same packet flow) and to coalesce these packets into a single large packet before additional processing is performed by the OS kernel TCP/IP stack. Thus, RSC reduces the number of packets that a TCP/IP stack needs to process and significantly reduces per-packet processing costs. RSC, in concept, performs the reverse operation of TCP Segmentation Offload (TSO), Large Segment Offload (LSO) or Giant Segment Offload (GSO) that happens on the transmit side where a large payload is handed over to the NIC for transmission and NIC handles fragmenting the payload into multiple TCP/IP packets and computing/updating headers for these packets.

RSC is a stateless and transparent offload mechanism that has historically been implemented either in software, which is fully flexible, or in the NIC hardware, which may improve performance at the expense of flexibility. For example, RSC support in the NIC hardware is usually implemented using hard-coded gates, such as via Application Specific Integrated Circuits (ASICs) or Field Programmable Gate Arrays (FPGAs). While a hard-coded solution in gates can meet performance goals, it requires a crystal ball to predict the logic that will be appropriate for every usage model during the lifetime of the product. Conversely, when implemented by software, the coalescing algorithm may be easily adjusted over time without requiring any changes to the hardware. However, software-based RSC implementations are likely to be too slow to keep up with network traffic delivered at 100 Gb/s and higher speeds.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1a is a schematic diagram illustrating processing of packets embedded in a stream of Ethernet frames using a conventional process;

FIG. 1b is a schematic diagram illustrating processing of packets embedded in a stream of Ethernet frames using an existing RSC scheme;

FIG. 2 is a diagram illustrating a mapping between an open criteria map and an RSC Open Profile bitmap, according to one embodiment;

DETAILED DESCRIPTION

Figure 3:
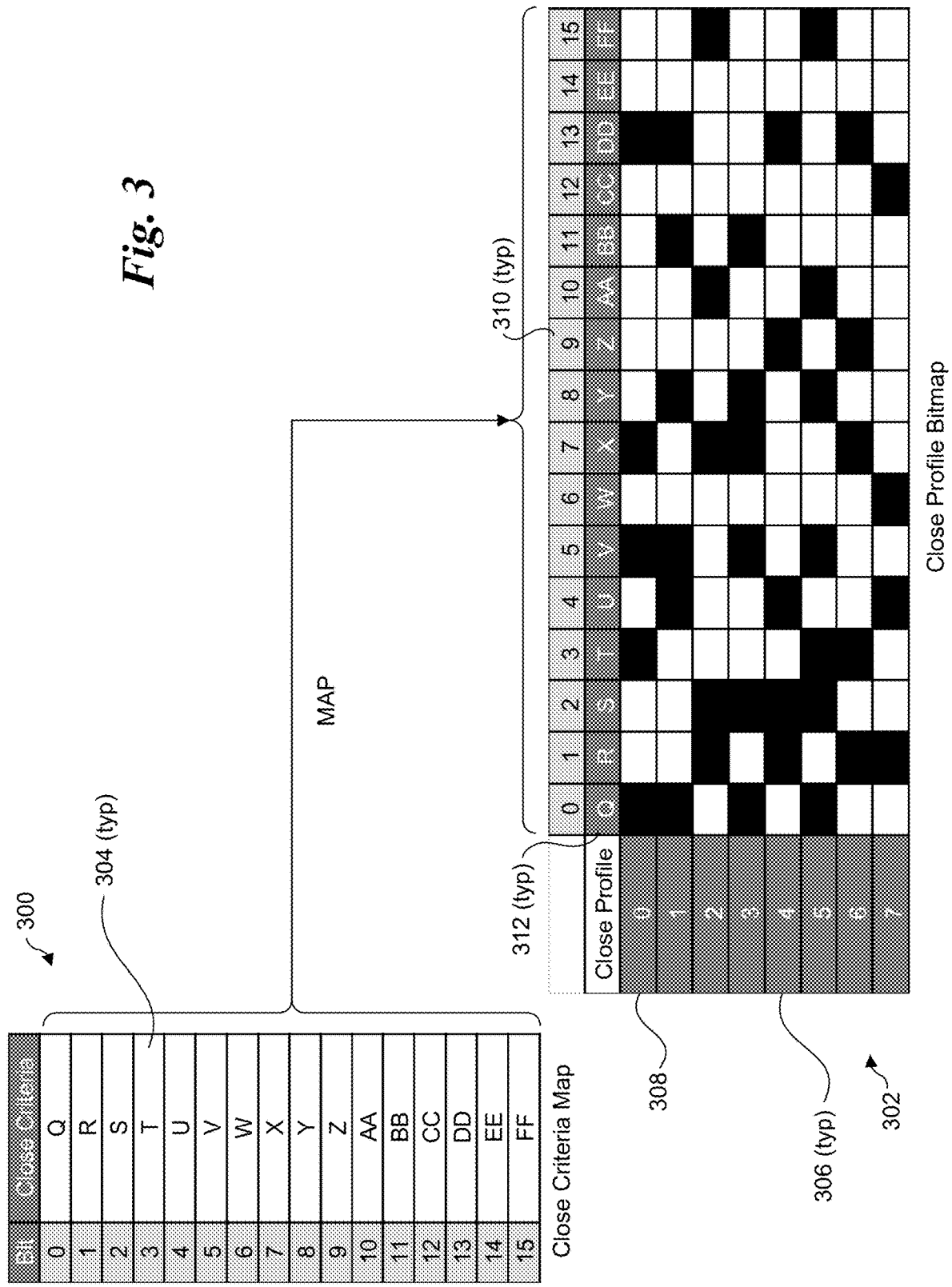
FIG. 3 is a diagram illustrating a mapping between a close criteria map and an RSC Close Profile bitmap, according to one embodiment.

Embodiments of methods, apparatus, and systems for implementing a semi-flexible packet coalescing control path are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Conventional TCP/IP Receive Processing

Conventional receive-side processing begins when NIC hardware receives an Ethernet frame (at an input port) from a network. The NIC extracts the TCP/IP packet embedded in the Ethernet frame and validates the frame by checking the CRC value embedded in the frame with a CRC value computed over the frame content. The NIC then grabs the next available descriptor to find out where in the host memory to copy the packet header and payload. The descriptor is a data structure that the Ethernet driver and NIC use to communicate and exchange information. These descriptors are allocated by the driver and arranged in a circular ring. The driver informs the NIC through these descriptors, among other things, address of a memory buffer (NIC buffer) to store the incoming packet data. The stack allocates several memory buffers to receive incoming packets. Depending on the OS, these buffers may or may not get reused. The NIC copies the incoming data into these memory buffers using a DMA (Direct Memory Access) engine to perform DMA Writes). Once the packet is placed in memory, the NIC updates a status field inside the descriptor to indicate to the driver that this descriptor holds a valid packet and generates an interrupt. This kicks off the software processing of the received packet (e.g., by the OS kernel TCP/IP stack).

Conventional RSC Overview

FIGS. 1*a* and 1*b* respectively illustrate how TCP/IP packets are processed without RSC and with a conventional implementation of RSC. As shown in FIG. 1*a*, a stream of TCP/IP packets 100 encapsulated in Ethernet frames 101 are received from a network 102 at an input port of a NIC 104*a* in the following order: A1, B1, A2, A3, B2, and C1. Under this nomenclature, the letters 'A' 'B' and 'C' identify a connection or flow the packet belongs to and the number '1', '2', '3' identifies the packet order corresponding to the connection or flow. Upon receipt of each Ethernet frame 101 at NIC 104*a*, the frame is validated and the packet 100 encapsulated in the frame (e.g., packet A1, B1, A2, A2, B2, and C1) is extracted and validated, followed by NIC 104*a* performing the various packet processing operations described above including obtaining a next descriptor and writing the packet header and payload for the packet into a buffer in host memory 106 specified by the descriptor. Under the non-RSC scheme illustrated in FIG. 1*a* the header and payload for each of packets A1, B1, A2, A2, B2, and C1 are written to host memory 106 using one or more DMA Writes, as depicted by full packet data 108 (i.e., packet header followed by packet payload).

Under the RSC embodiment of FIG. 1*b*, the same stream of Ethernet frames containing packets A1, B1, A2, A2, B2, and C1 are received at an input port of a NIC 104*b* that includes RSC components for implementing RSC functionality, as depicted by an RSC cache 112 and RSC logic 114. As before, the packets are extracted from the Ethernet frames and the frames are verified, followed by some initial packet-processing operations. However, under RSC, rather than writing the packet content as full packet data for all packets, packet payload data from multiple packets identified as belonging to the same flow are coalesced into a larger packet with a single header, as depicted by coalesced packets 116 and 118, which respectively coalesced packet data from flows 'A' and 'B'. As further shown in FIG. 1*b*, some packets may be written as full packet data, as depicted by full packet data 120 corresponding to packet C1.

To perform coalescing, RSC saves some information (state) about each connection (aka flow) for which the NIC decides to coalesce. This information is saved in a cache on-board the NIC, such as depicted by RSC cache 112. Under one conventional approach, information stored in the RSC cache includes, IP, TCP header info from first packet in flow
Descriptor information
Starting offset in the payload buffer for the next incoming packet's payload
Number of packets coalesced
Current TCP checksum
Number of bytes coalesced Under one embodiment of a conventional RSC implementation, RSC logic 114 on NIC 104*b* extracts TCP/IP header fields from incoming packets and does a series of tests to determine whether to coalesce the packet or to stop existing coalescing. In one embodiment RSC logic 114 uses the following packet coalescing criteria:

TCP/IP packet (IP.protocol==6)
Not an IP fragment (IP.Flags.DF==1 && IP.Flags.MF==0)
No IP (v4 and v6) header options are set
Valid TCP Checksum (+ valid CRC for RDMA)
Data packet (tcp.payload>0 bytes)
Correct TCP sequence number
No SYN, FIN, RST and URG flags are set in TCP header
No TCP header options other than TCP Timestamp option are set TCP flags other than PSH and ACK force the current coalescing to stop for this connection. An incoming packet with these flags is sent to the stack separately.

If TCP "PSH" flag is set and no coalescing is in progress for this connection, then send this packet as is. If coalescing is in progress for this connection, then append this packet and close the descriptor.

Out of order packet forces coalescing to stop

Incoming payload is not split across multiple descriptor buffers

The foregoing set of packet coalescing criteria is merely exemplary, as an RSC implementation may use different packet coalescing criteria. In the following conventional embodiment, packet coalescing is controlled by the RSC logic on the NIC.

If an incoming packet is the first packet for a TCP/IP connection, and RSC logic decides to start coalescing, then the packet's TCP/IP header is removed and relevant information from the header is saved in the RSC cache. The packet's payload (TCP segment) is then copied (DMA'ed) into a buffer allocated in host memory by the NIC driver. In some implementations, RSC does not hold onto the payload while coalescing is in progress, so it does not need any additional memory on the NIC. When a second packet on the same connection comes and if it meets coalescing criteria, then the entries in the RSC cache are updated (how many bytes received, starting offset in the buffer for next packet's payload, etc.). TCP/IP headers are stripped from the packet and the packet's payload is copied immediately following the payload data for the previous packet (for that connection) in the same buffer. When the RSC logic decides to stop coalescing for a connection, either because an incoming packet does not meet coalescing criteria (out of order packet, payload does not fit in the remaining space in the buffer, PSH flag in TCP header is set, etc.) or for another reason, at that point the modified header in the RSC cache for that connection is written back to the memory at the location specified in the descriptor.

As discussed above, the logic for implementing RSC processing in hardware on the NIC has historically been hard-coded using logic gates and the like (e.g., ASIC, FPGA, etc.). While this enables the NIC to keep up with high-speed traffic bandwidth, it reduces the use cases the NIC can handle. For example, there are at least two important use cases for RSC:

1) Host Consumption: The goal for this use case is to coalesce as much as possible in order to minimize interactions between different software layers in the system.

2) Packet Forwarding: The goal for this use case is to guarantee that there is no change in packet boundaries and per-packet protocol header content when received packets are transmitted out on the wire using Giant Send Offload (GSO) or TCP Segmentation Offload (TSO).

In addition, different operating systems may have different assumptions or requirements with respect to coalesce logic. For example, Microsoft Windows® operating systems may have certification requirements, and devices that don't meet these requirements may not be able to be certified with RSC enabled. Open Source operating systems may change their coalesce logic over time, and if a device is not able to match the logic that is used in the operating system, the administrator may choose not to offload RSC. Some current NICs that support RSC for Host Consumption do not guarantee that there is no change in packet boundaries and per-packet protocol header content when received packets are transmitted out on the wire using GSO or TSO, and thus may not be used in installations requiring Packet Forwarding.

For these reasons, fixed hard-coded logic for coalescing is likely to result in a product that quickly becomes obsolete. Accordingly, it would be advantageous to provide a product with hardware-based logic that is able to handle high-speed traffic flows while providing the ability to easily change the coalesce logic and associated RSC control path. Moreover, it would be advantageous that such a product could be used with a variety of different operating systems in a variety of use cases.

Semi-Flexible Packet Coalescing (PC) Control Path

Under the embodiments herein, the hardware on the NIC is configured to support multiple packet coalescing (PC) profiles to address different use cases and OS requirements. The PC profiles include separate sets of PC Open Profiles and PC Close Profiles. Each PC Open Profile includes a set of criteria that is evaluated during hardware-based processing of a received packet to determine whether an PC context should be opened for buffering that packet. Meanwhile, each PC Close Profile includes a set of criteria that is evaluated in connection with hardware-based processing of a packet to determine whether an existing PC context should be closed.

An PC Open Profile and an PC Close Profile is associated with each of one or more receive queues on the NIC used to buffer received packet data prior to DMA'ing the packet data into receive buffers allocated by an OS or OS driver in host memory. Under one aspect of some embodiments, a data structure comprising a table or map is implemented on the NIC that contains a list of PC context open criteria, with each open criteria entry in the table being mapped to an associated index in the data structure. A data structure containing a similar table or map containing PC context close criteria is also implemented on the NIC. Rather than directly specifying the full list of criteria for a given PC Open Profile or PC Close Profile, each PC Open and Close Profile comprises a bitmap that identifies which open and close criteria are to be implemented for the profiles, wherein the index of the bits in the bitmaps are mapped to the indexes of corresponding criteria in the open and close criteria data structures.

The foregoing scheme and related mappings are schematically illustrated in FIGS. 2 and 3. As shown in FIG. 2, row indexes for open criteria entries in an open criteria map 200 are mapped to column indexes in an open profile bitmap 202, thus specifying which open criteria is to be enabled for various PC Open Profiles using a pair of data structures. Open criteria map includes a plurality of open criteria entries 204, each defining respective open criteria to be evaluated for opening an PC context, as depicted by letters 'A', 'B', 'C', etc. In practice, actual open criteria would be specified for each open criteria entry 204, such as "the packet is a TCP/IP packet", "not an IP fragment", "includes a Valid TCP Checksum", etc.

For illustrative purposes, open criteria map 200 shows a respective bit value corresponding to the row index for each open criteria entry 204. As will be recognized by those skilled in the art, in an actual implementation the bit values would correspond to indexes in a 1×N data structure, where N is the number of entries. In this example N=16, thus open criteria map 200 includes 16 open criteria entries. However, this is merely exemplary, as N may generally be any integer value greater than 1.

Open profile bitmap 202 includes a plurality of (PC) open profile entries 206, each including a one-dimensional bitmap that is used to indicate which open criteria in open criteria map 200 are to be applied for each open profile (entry), wherein a box that is colored black indicates the open criteria mapped to the index location of the box is to be implemented, while the column indexes having white boxes correspond to row indexes of open criteria entries in open criteria map that are not implemented for the PC Open Profile. For illustrative purposes, open profile bitmap 202 depicts bit or column indexes 210 and corresponding open criteria entries 212. By way of example, open profile entry 208 at bit (row) index '0' includes black boxes at column indexes '0', '2', '5', '7', '8', and '11', which respectively are mapped to open criteria entries 'A', 'C', 'F', 'H', 'I', and 'L' in open criteria map 200 having row indexes 0, 2, 5, 7, 8 and 11.

In one embodiment, open profile bitmap 202 is implemented as an N×M bitmap data structure, where N, as before, is the number of open criteria entries and M is the number of open profile entries. In open profile bitmap 202 M=8; however, this is merely exemplary as M may generally be any integer greater than one. Under the N×M bitmap data structure, the row and column index values are inherent in the data structure, thus the data structure does not include separate rows or columns containing row or column index values.

FIG. 3 shows a close criteria map 300 including a plurality of close criteria entries 304 and having its row indexes mapped to corresponding column indexes in a close profile bitmap 302 that includes a plurality of (PC) close profile entries 306. The values 'Q', 'R', 'S', 'T', etc., depicted for close criteria entries 304 represent corresponding criteria for closing an PC context. Non-limiting examples of PC close criteria include:
Change in header structure or TCP flags
Packet is a pure ACK
Out-of-order packet received
Segment size is different from the segment size of the packet which opened the flow
Packet will result in a coalesced packet that is too large Generally, the mapping between close criteria map 300 and close profile bitmap 302 operates in the same manner as the mapping between open criteria map 200 and open profile bitmap 202 in FIG. 2. As before, for illustrative purposes, close profile bitmap 302 depicts bit or column indexes 210 and corresponding close criteria entries 312, observing that neither of these rows are actually present in the data structure for close profile bitmap 302. By way of example, open profile entry 308 at bit (row) index '0' includes black boxes at column indexes '0', '3', '5', '7', and '13', which respectively are mapped to close criteria entries 'Q', 'T', 'V', 'X', and 'DD' in close criteria map 200 at row respective row indexes 0, 3, 5, 7, and 13.

In one embodiment, close profile map 300 is implemented as a 1×P data structure, while close profile bitmap 302 is implemented as an P×Q bitmap data structure, where P, as before, is the number of close criteria entries and Q is the number of close profile entries. As before, under the P×Q bitmap the row and column index values are inherent in the data structure, thus there are not separate rows or columns containing row or column indexes in the P×Q data structure. Generally, the number M and Q of open profile entries 206 and close profile entries 306 may be the same or may differ. Similarly, the number N and P of open criteria entries 204 and close criteria entries 304 may be the same or may differ.

Figure 4:
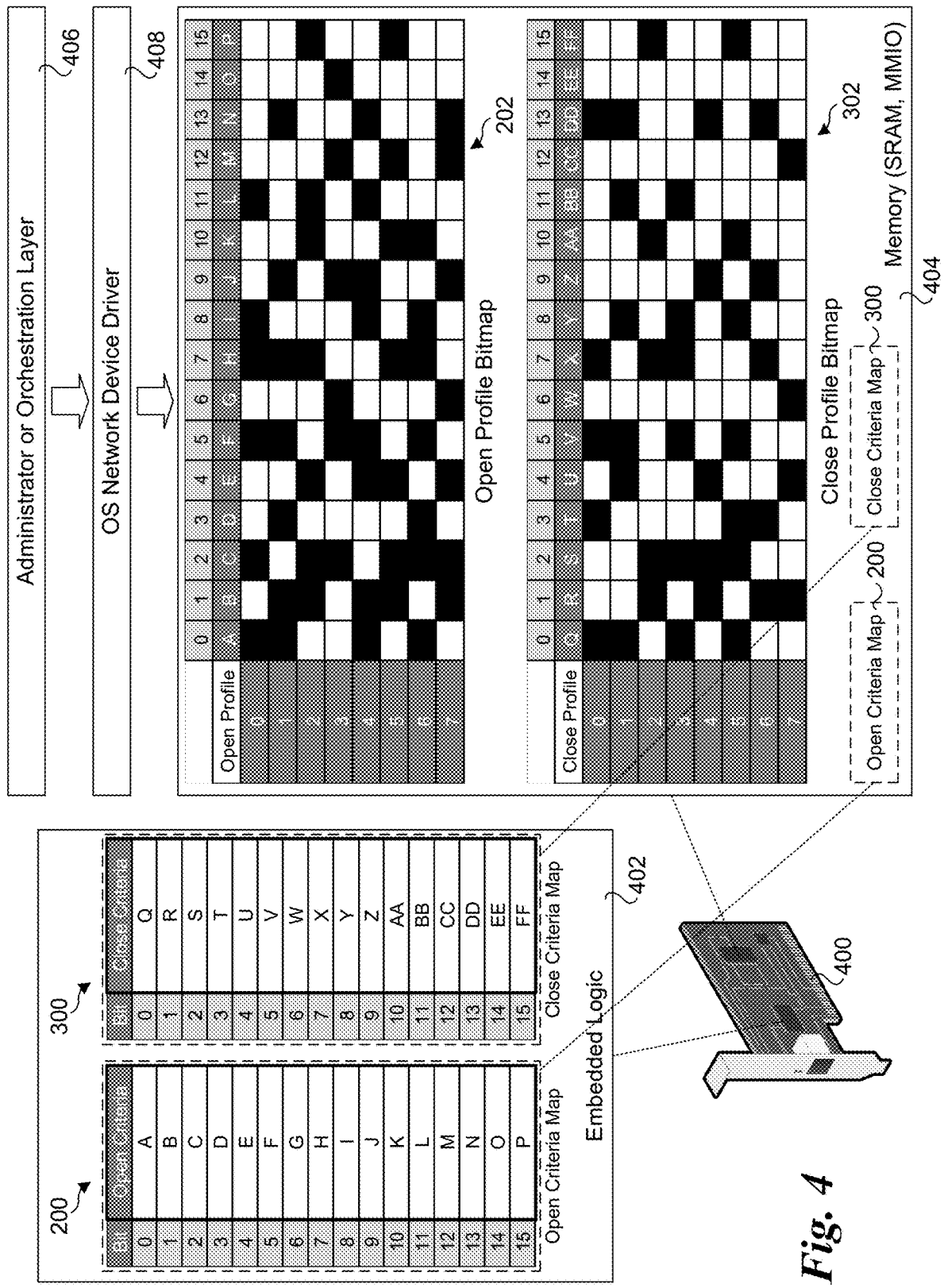
FIG. 4 is a schematic diagram depicting implementation of the open criteria map and RSC Open Profile bitmap of FIG. 2 and the close criteria map and RSC Close Profile bitmap of FIG. 3 on a network interface comprising an Ethernet NIC.

FIG. 4 shows a NIC 400 configured to implement operations and store data associated with opening and closing PC contexts, according to one embodiment. As illustrated, NIC 400 includes embedded logic 402 and memory 404. Embedded logic 402 is configured to evaluate each of the PC open criteria in open criteria map 200 and each of the PC close criteria in close criteria map 300. Generally, embedded logic 402 may comprise any type of circuitry and logic for implementing corresponding functionality, such as evaluation of PC open and close criteria. For example, in some embodiments embedded logic may include hard-coded logic such as ASICs, FPGAs, or similar fixed or programmable logic circuitry, while other embodiments may employ one or more processing elements, engines, etc., configured to execute firmware instructions or the like to effect corresponding operations and logic. In other embodiments, a combination of hard-coded and/or programmable circuitry and processing elements configured to execute firmware may be used.

Memory 404 is used to store open profile bitmap 202 and close profile bitmap 302. As depicted by the dashed boxes in FIG. 4, open criteria map 200 and close criteria map 300 may be stored in memory 404 or in a portion of memory provided with embedded logic 402. For example, in some embodiments, embedded logic 402 may be implemented in an FPGA chip with on-chip memory or in a System on a Chip (SoC) including one or more processing elements and/or engines and on-chip memory. In some embodiments memory 404 is implemented as a form of SRAM (Static Random Access Memory), such as in an SRAM chip. Other embodiments may employ Dynamic RAM (DRAM) chips or modules (e.g., DRAM DIMMS). In some embodiment, a portion of the address space for memory 404 is implemented as a Memory-Mapped Input/Output (MMIO) address space, enabling a host to directly write and read data in the MMIO address space using DMA operations over an interconnect between the host and NIC 400. For example, in some embodiments NIC 400 is a Peripheral Component Interconnect Express (PCIe) peripheral card configured to support DMA data transfers using PCIe Write and Read transactions. Optionally, the functionality of NIC 400 may be implemented in a daughter board, in an SoC, or as multiple discrete components integrated on the same board as a host processor or SoC.

Under one approach, at device configuration time an administrator or orchestration layer 406 is used in combination with an OS network device driver 408 for NIC 400 to configure a small number of PC Open Profiles and PC Close Profiles by writing data defining open profile bitmap 202 and close profile bitmap 302. The details of these available profiles will be exposed to software when the software queries device capabilities, such as during platform boot-up. It may also be possible for software to request/demand a change in configuration if needed. For each receive queue that's enabled for PC, software is expected to configure the queue with the desired PC profiles for both Open and Close behavior.

Figure 5:
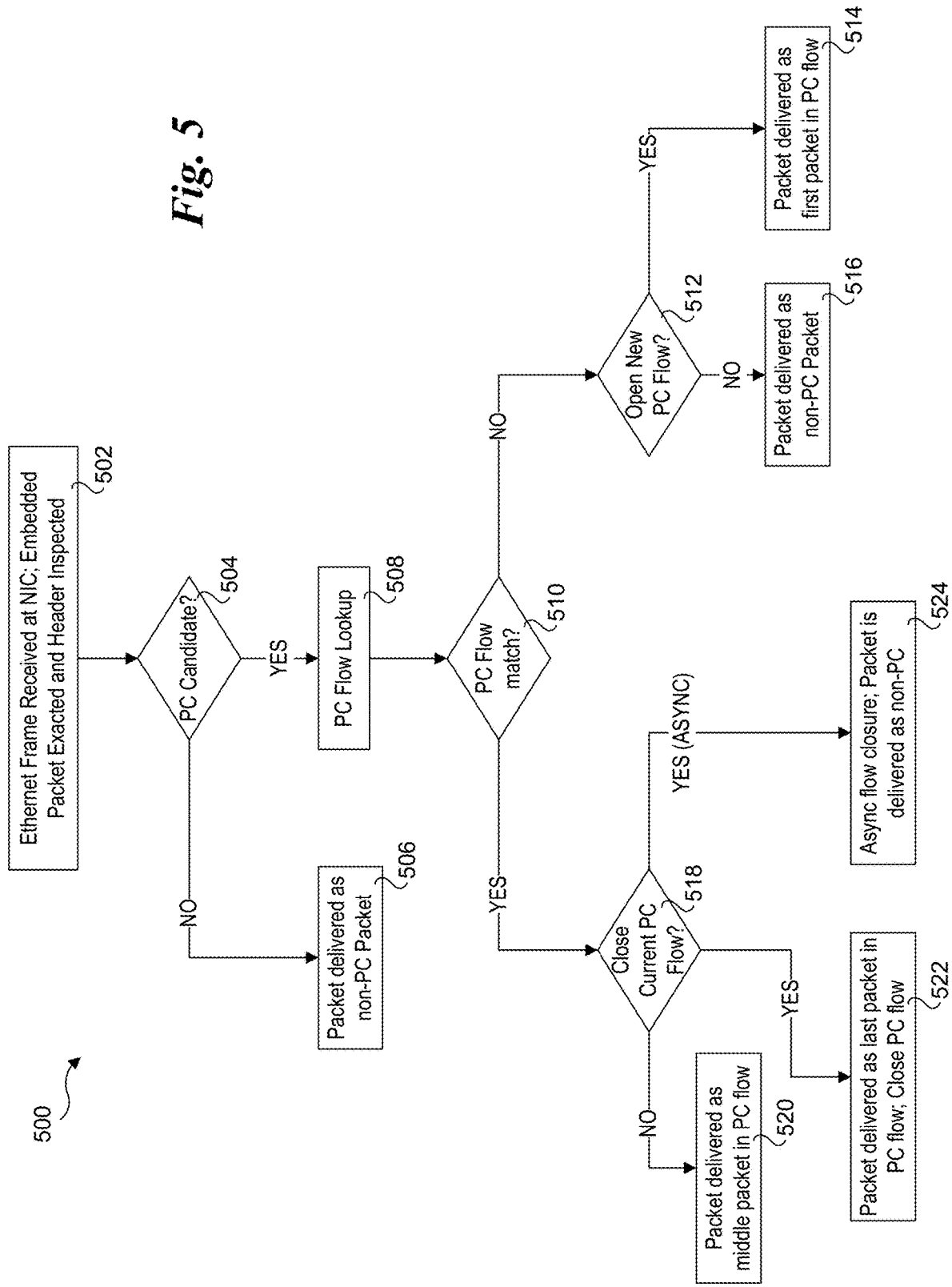
FIG. 5 is a flowchart illustrating operation and logic for performing RSC-related packet-processing operations on a network interface device using the open criteria map and RSC Open Profile bitmap of FIG. 2 and the close criteria map and RSC Close Profile bitmap of FIG. 3, according to one embodiment.

FIG. 5 shows a flowchart 500 illustrating operations and logic implemented in hardware on a NIC during runtime operations to facilitate the hardware portion of packet-processing operations on a platform implementing a semi-flexible PC control path. The process begins in a block 502 in which an Ethernet frame is received at an input port of the NIC. As described above, conventional operations will be performed including CRC check of the frame data, extraction of a Layer 4 packet contained in the Ethernet frame, and inspection of the Layer 4 header for the packet. For example, it is envisioned that most or all of the traffic in the installation environment will include TCP/IP packets and UDP packets. In some embodiments, all traffic may be TCP/IP packets.

In a decision block 504 a determination will be made whether the packet is an PC candidate. For example, a TCP/IP packet may be an PC candidate if it meets appropriate filter criteria. As depicted by a NO result for decision block 504, if the packet is not an PC candidate the packet is delivered to the host as a non-PC packet using conventional packet processing operations on the NIC, as shown in a block 506. As used herein, "delivered to the host" using conventional packet processing operations on the NIC may include any scheme for writing packet content/data and associated information into memory on the host, including but not limited to writing a packet or a split packet header and payload into a buffer (or separate buffers) and writing a corresponding descriptor(s) (for the packet or split packet data) onto a descriptor ring or queue in host memory.

If the packet is an PC candidate, the answer to decision block 504 is YES, and the logic proceeds to a block 508 in which an PC flow lookup if performed to determine whether the packet belongs to a flow for which an PC context is currently open. In a decision block 510 a determination is made to whether the PC flow lookup results in a match; if not, the answer is NO and the logic proceeds to a decision block 512 in which a determination is made whether to open an new PC (coalesced) flow or it the packet should be delivered to the host as a single packet, meaning the packet is classified to a flow for which a current PC context is open. To determine whether to open a new PC flow, embedded logic 402 will perform a series of open criteria checks on the packet using the open criteria indicated in the PC Open Profile defined for the receive queue in which the packet is buffered. Generally, the receive queue to which the packet will be buffered will be chosen in block 502 and may depend on the configuration of the host, as described below.

If a new PC flow is to be opened, the answer to decision block 512 is YES and the logic proceeds to a block 514 in which a new PC flow (and associated PC context) is opened and the packet is delivered as the first packet in the PC. If the answer to decision block 512 is NO, the logic proceeds to a block 516 in which the packet is delivered to the host as a non-PC packet.

Returning to decision block 510, if there is an PC flow match for the packet the answer to decision block 510 is YES and the logic proceeds to a decision block 518 in which a determination is made as to whether to close the current PC flow. This determination is made using embedded logic 402 to evaluate a series of close criteria defined by the PC Close Profile for the receive queue. If the flow is to remain open, the answer to decision block 518 is NO and the logic flows to a block 520 in which the packet is delivered as a middle packet in the open PC flow. If one or more of the PC close criteria is met the answer to decision block 518 is YES the logic proceeds to a block 522 in which the packet is delivered to the host as a last packet in the PC flow, and the PC flow is closed, along with its associated PC context.

As depicted by the YES (ASYNC) branch from decision block 518, it is also possible to have an asynchronous closure of an PC flow that is not performed in connection with evaluating PC close criteria for a packet. In this instance, the PC flow is closed asynchronously, and the packet is delivered as a non-PC packet in a block 524.

As used herein, delivered as a first packet, middle packet, and last packet of an PC flow means the packet data (for the packet) is written into host memory and is included as part of an PC flow (e.g., sequence of packet payload and or segments) that forms a coalesced packet. The header and/or PC context information associated with the PC packet or flow may generally be written once (e.g., after the PC flow and/or context is closed and all data to be coalesced has been written to host memory) or may be updated as each packet payload or segment is added to a given coalesced packet/flow. Different operating systems and/or NIC hardware may use different schemes for coalescing packet data and/or segments (e.g., TCP segments), with the particular scheme being non-limiting and outside the scope of this disclosure.

The semi-flexible packet coalescing control path scheme provided by the embodiments disclosed herein may be dynamically adjusted based on changes in usage models or for other reasons. For example, the PC Open and Close Profiles may be modified by changing the bitmaps associated with PC profiles in PC Open Profile bitmap 202 and/or PC Close Profile bitmap 302. Additionally, the PC Open Profile and PC Close Profile may be changed for a given receive queue on the NIC. For example, in some scenarios, an operator may desire to only coalesce packets that exceed a certain minimum size. In some scenarios, an operator may want to allow coalescing of packets with certain TCP options, while in other scenarios the operator may not want to allow this.

In addition to supporting packet coalescing for TCP and UDP packets, the teaching and principles disclosed herein may be applied to Stream Multiplex Protocol (SMP) such as Quick UDP Internet Connections (QUIC). The QUIC packet format and transport protocol was developed by engineers at Google and was originally presented in the paper, The QUIC Transport Protocol:Design and Internet-Scale Deployment, available at https://static.googleusercontent.com/media/research.google.com/en//pubs/archive/46403.pdf. In addition, the Internet Engineering Task Force (IETF) has published a draft for a standardized version of QUIC at https://tools.ietf.org/html/draft-ietf-quic-transport-23.

Figure 6:
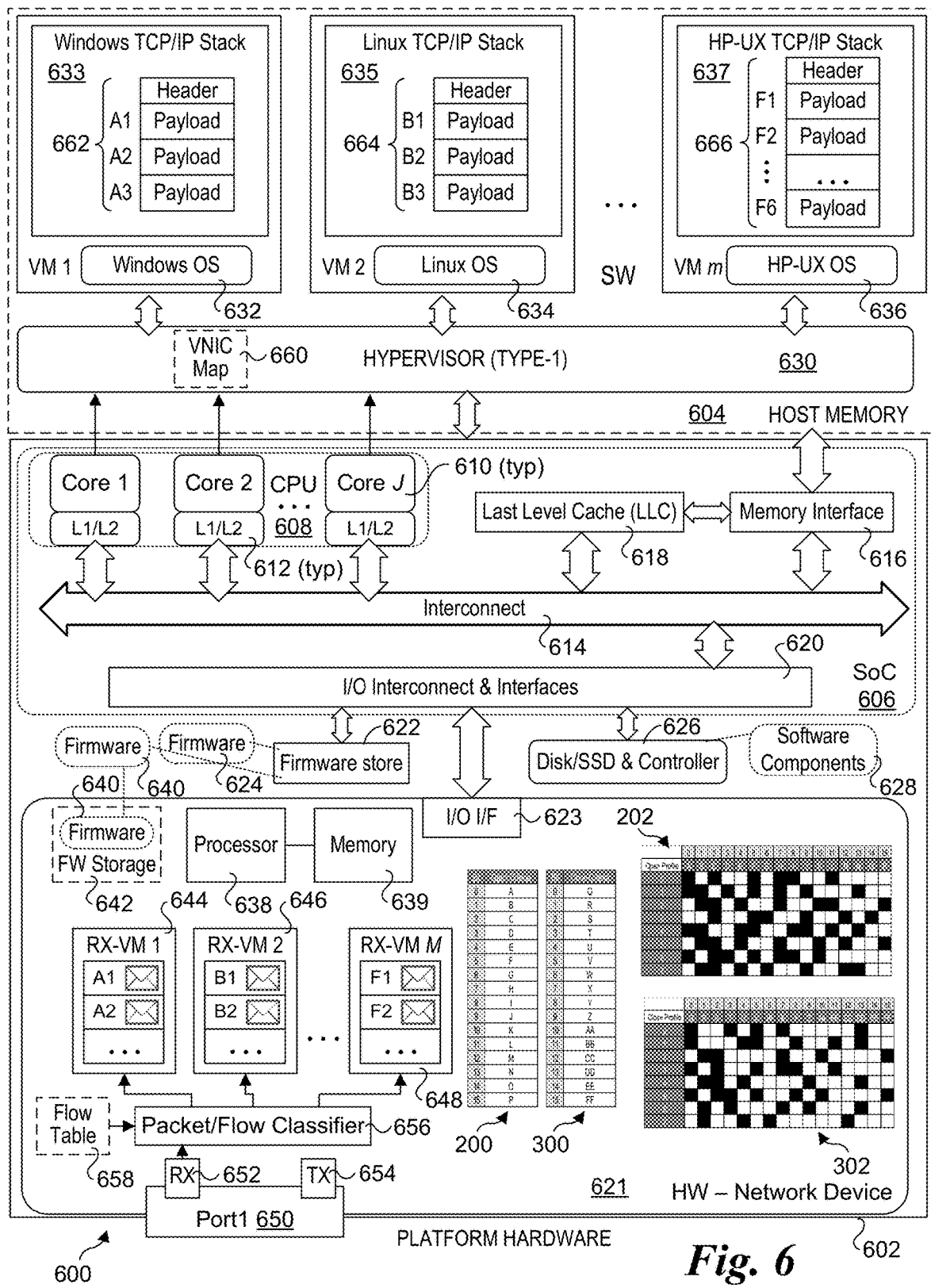
FIG. 6 is a schematic diagram of a platform architecture configured to host a plurality of virtual machines running instances of various operating systems, and a network interface configured to implement the hardware device operations and functionality of FIGS. 2-5, according to one embodiment.

FIG. 6 shows one embodiment of a platform architecture 600 corresponding to a computer platform suitable for implementing aspects of the embodiments described herein. Architecture 600 includes a hardware layer in the lower portion of the diagram including platform hardware 602, and a software layer that includes software components running in host memory 604.

Platform hardware 602 includes a processor 606 having a System on a Chip (SoC) architecture including a central processing unit (CPU) 608 with J processor cores 610, each coupled to a Level 1 and Level 2 (L1/L2) cache 612. Each of the processor cores and L1/L2 caches are connected to an interconnect 614 to which each of a memory interface 616 and a Last Level Cache (LLC) 618 is coupled, forming a coherent memory domain. Memory interface is used to access host memory 604 in which various software components are loaded and run via execution of associated software instructions on processor cores 610.

Processor 606 further includes an Input/Output (I/O) interconnect hierarchy, which includes one or more levels of interconnect circuitry and interfaces that are collectively depicted as I/O interconnect & interfaces 620 for simplicity. Various components and peripheral devices are coupled to processor 606 via respective interfaces (not all separately shown), including a network controller 621 via an I/O interface 623, a firmware storage device 622 in which firmware 624 is stored, and a disk drive or solid state disk (SSD) with controller 626 in which software components 628 are stored. Optionally, all or a portion of the software components used to implement the software aspects of embodiments herein may be loaded over a network (not shown) accessed, e.g., by network controller 621. In one embodiment, firmware 624 comprises a BIOS (Basic Input Output System) portion and additional firmware components configured in accordance with the Universal Extensible Firmware Interface (UEFI) architecture.

During platform initialization, various portions of firmware 624 (not separately shown) are loaded into host memory 604, along with various software components. In architecture 600 of FIG. 6 the software components include a Type-1 hypervisor 630, also known as a "bare-metal" hypervisor. Optionally, a Type-2 hypervisor may be used (not shown), or a virtualization scheme supporting a container-based architecture may be used (not shown). One of the primary differences between a Type-1 hypervisor and a Type-2 hypervisor is the Type-2 hypervisor is implemented as an application running on host operating system, while in a Type-1 hypervisor the hypervisor runs directly on the platform hardware without a host operating system (i.e., it runs on the "bare metal" of the platform, hence the name).

Under platform architecture 600, each of m virtual machines (VMs) VM 1 . . . . VM m includes a respective operating system instance, as depicted by Windows OS 632 for VM 1, Linux OS 634 for VM 2, and HP-UX 636 for VM m. Also, each operating system includes a TCP/IP stack configured to access a memory space in which TCP/IP packet data including coalesced packet data are buffered. These are depicted as Windows TCP/IP stack address space 633 for VM 1, Linux TCP/IP stack address space 635 for VM 2, and HP-UX TCP/IP stack address space 637 for VM m. Generally, the VMs for a given system may host multiple instances of the same operating system or instances of two or more different operating systems (such as shown in FIG. 6).

In FIG. 6, a portion of the circuitry and logic for implementing the hardware device functionality of FIGS. 2-5 described above includes a processor 638, coupled to memory 639, and firmware 640 that is executed on processor 638. Generally, firmware 640 may be stored on-board network controller 621, such as in a firmware storage device 642, or loaded from another firmware storage device on the platform external to network controller 621 during pre-boot, such as from firmware store 622.

Memory 639 generally may include one or more physical memory devices such as DRAM DIMMs (Dual in-line memory modules), NVDIMMs (Non-volatile DIMMs) and memory chips. Memory 639 is configured to implement one or more address spaces in which various data are buffered and data structures are stored. These include PC-enabled receive (RX) buffers 644, 646, and 648, an open criteria map 200, a close criteria map 300, an PC Open Profile bitmap 202, and an PC Close Profile bitmap 302.

Network controller 621 includes one or more ports 650, each including various circuitry and logic for implementing PHY and MAC Layer operations and including a RX buffer 652 and a Transmit (TX) buffer 654. In the manner described above for block 502 of flowchart 500, as Ethernet frames are received a port 650, conventional operations will be performed including CRC check of the frame data, and extraction of a Layer 4 packet contained in the Ethernet frame. The Layer 4 packet data are buffered in RX buffer 652, and the packet header data are inspected by packet/flow classifier 656, which uses cached flow table entries in a flow table 658 to determine whether the packet belongs to an existing PC flow or non-PC flow.

When a new VM is launched, hypervisor 630 (and/or another software component(s)) will configure various virtualized interfaces and functions corresponding to physical resources and physical functions provided by platform hardware 602. The virtualized interfaces include a virtual NIC (VNIC) that operates as a virtualized interface to network controller 621. Each VNIC will have its own MAC address and appears from the perspective other VMs and entities external to the computer platform as a physical NIC interface. A VNIC map 660 is maintained by Hypervisor 630 and used to map packets to appropriate queues and/or buffers based on the MAC address of the packets. The network device driver for the OS running on the VM will also interface with network controller 621 to configure one or more receive queues, such as PC enabled receive queue 644 for VM 1. Each operating system network stack will also maintain one or more flow tables used to classify flows and map classified flows to appropriate buffers and queues.

For simplicity, packet/flow classifier 656 is shown as a single block; in practice, the operations implemented for packet and flow classification may involve a pipeline of operations, as is known in the art. As depicted in FIG. 6, packet/flow classifier 656 enqueues packets into PC-enabled receive queues 644, 646, and 648, depending on the result of the packet/flow classification operations. Generally, non-PC packets will be buffered in non-PC receive queues (not shown).

In one embodiment, the operations and logic for blocks numbered 508 and above will be implemented for packets that are enqueued in PC-enabled receive queues 644, 646, and 648. These operations will result in both coalesced and non-coalesced packet data being DMA'ed to buffers in host memory 602 that are allocated for access by the TCP/IP stacks for the operating system instances hosted on the VMs. For illustrative purposes, a coalesced packet 662 including packet payload or TCP segment data from packets A1, A2 and A3 is depicted as being DMA'ed to a buffer in Windows TCP/IP stack address space 633. Similarly, a coalesced packet 664 including packet payload or TCP segment data from packets B 1, B2 and B3 is depicted as being DMA'ed to a buffer in Linux TCP/IP stack address space 635, and a coalesced packet 666 including packet payload or TCP segment data from packets F1, F2, . . . . F6 is depicted as being DMA'ed to a buffer in HP-UX TCP/IP stack address space 637.

For illustrative purposes, the coalesced packet header and payloads are logically depicted as a contiguous unit. However, as will be recognized by those skilled in the PC art, coalesced packet headers and payload data may be buffered using various schemes, including contiguous and non-contiguous schemes. For example, information in a descriptor or other data structure used by an OS networking stack may contain information such as pointers that map to the locations of the non-contiguous coalesced payloads/segments, linked lists may be used, etc. More generally, the principles and teachings disclosed herein may be applied to various coalescing schemes including existing and future schemes, with the particular scheme not being limited to the scope of this disclosure.

Figure 6A:
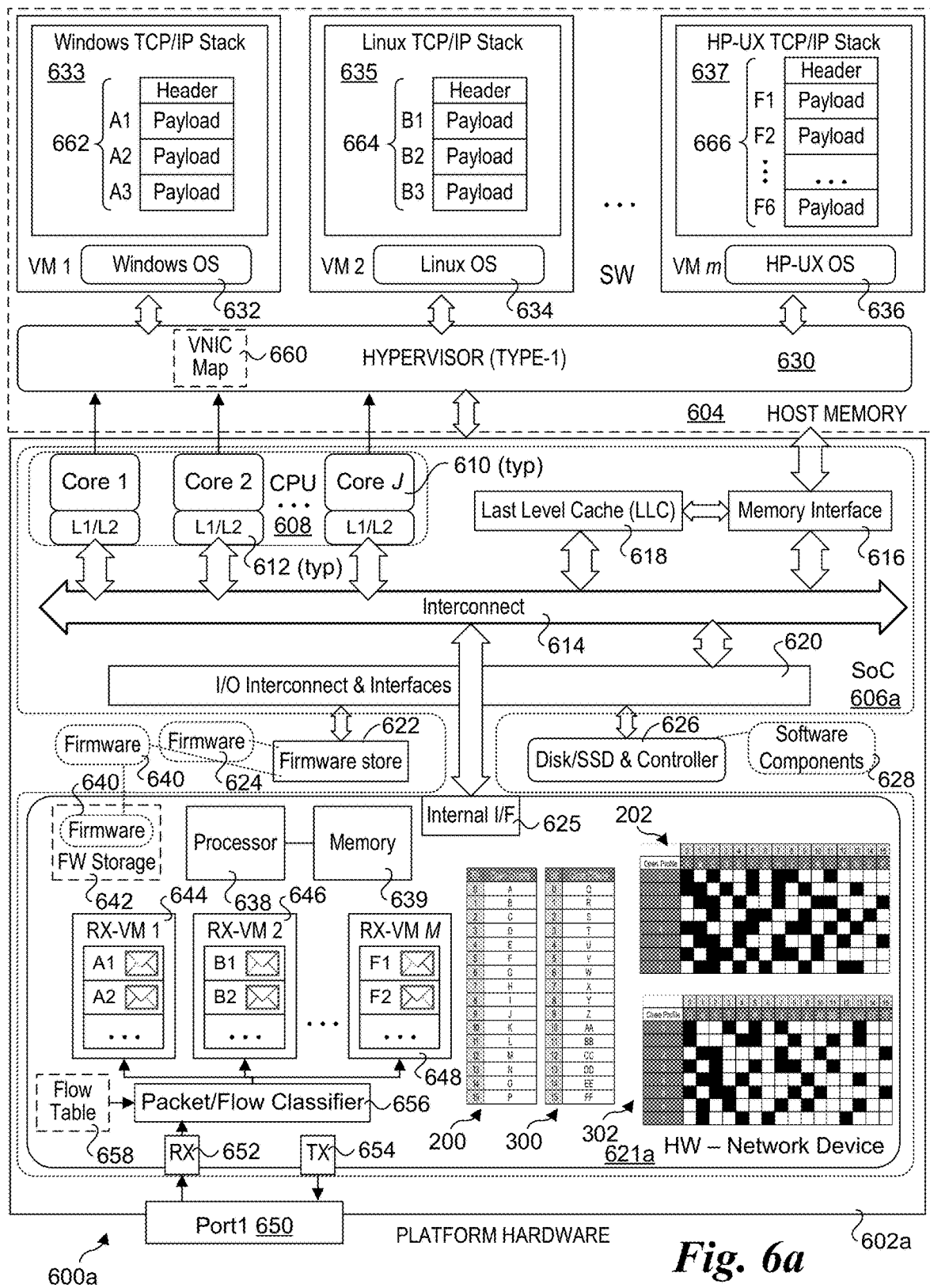
FIG. 6a is a schematic diagram of a platform architecture similar to that shown in FIG. 6 in which the network controller is integrated in the SoC.

FIG. 6a shows a platform architecture 600a including an SoC 606a having an integrated network controller 621a configured in a similar manner to network controller 621 in platform architecture 600, with the following differences. Since network controller 621a is integrated in the SoC it includes an internal interface 625 coupled to interconnect 614 or another interconnect level in an interconnect hierarchy (not shown). RX buffer 652 and TX buffer 654 are integrated on SoC 406A and are connected via wiring to port 650, which is a physical port having an external interface. In one embodiment, SoC 606a further includes I/O interconnect and interfaces and platform hardware includes firmware, a firmware store, disk/SSD and controller and software components similar to those shown in platform architecture 600.

The CPUs 608 in SoCs 606 and 606a may employ any suitable processor architecture in current use or developed in the future. In one embodiment, the processor architecture is an Intel® architecture (IA), including but not limited to an Intel® x86 architecture, and IA-32 architecture and an IA-64 architecture. In one embodiment, the processor architecture is an ARM®-based architecture.

As discussed above, the network devices disclosed herein may include but are not limited to network adapters, network controllers or NICs, InfiniBand HCAs, and host fabric interfaces (HFIs). Under some embodiments, the network adaptors, controllers, and NICs are configured to be implemented using one or more Ethernet protocol defined by IEEE 802.3-based protocols. Other types of protocols may also be used, as will be recognized by those having skill in the networking arts.

Figure 7:
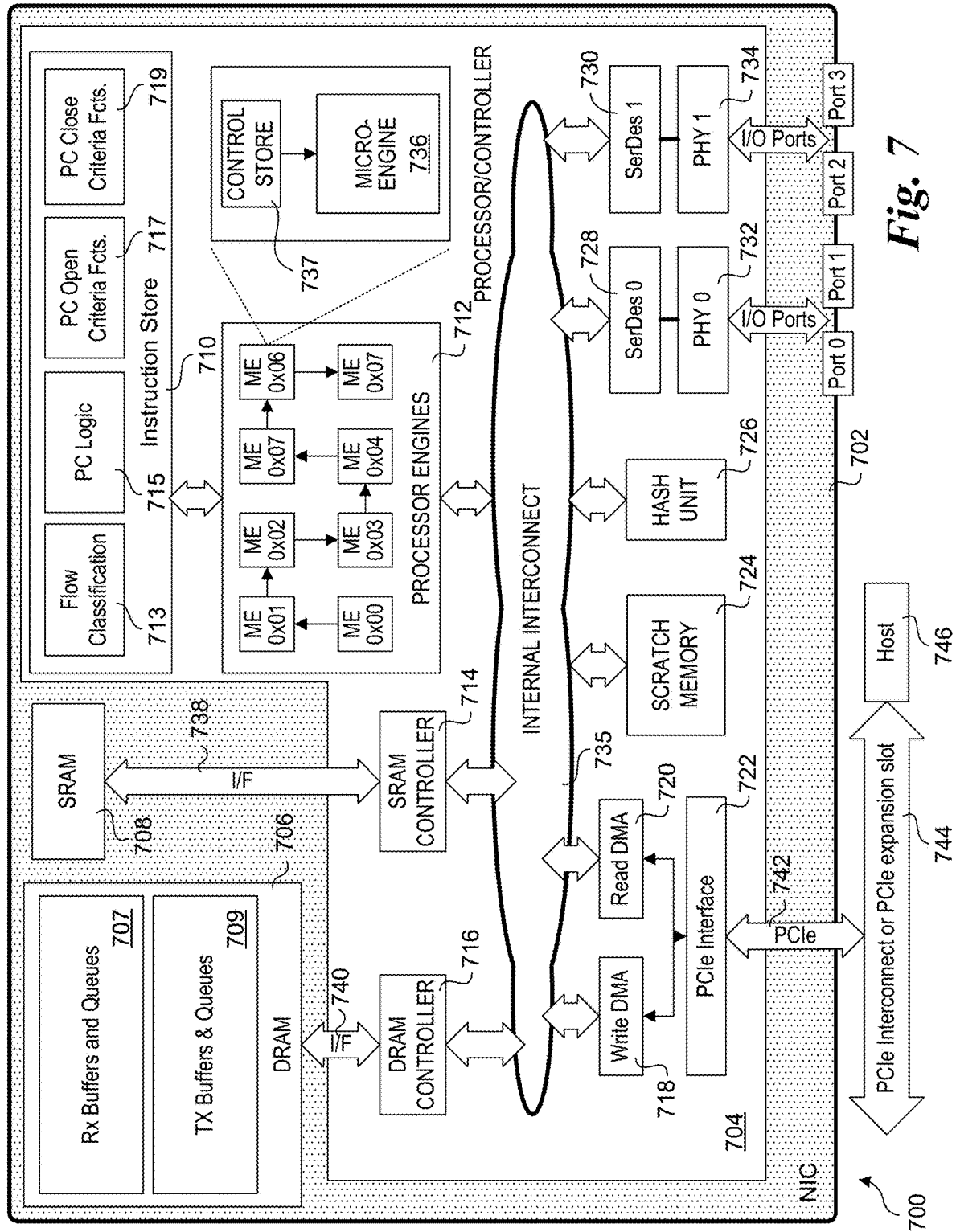
FIG. 7 is a schematic diagram illustrating an architecture for a NIC that may be used for implementing aspects of the network interfaces disclosed herein, according to one embodiment.

An exemplary system architecture for a NIC 700 is shown in FIG. 7. NIC 700 includes a NIC system board 702 on which a network processor/controller 704, Dynamic Random Access Memory (DRAM) 706 and Static Random Access Memory (SRAM) 708 are mounted. Under various embodiments. NIC system board 702 is representative of an Ethernet controller card, a daughter board, a multi-chip module board or substrate, or it may be part of a computer system board, such as a main board or motherboard for a computer server. Processor/controller 704 is representative of Ethernet processing and/or control unit, and may be embodied in various forms, including as an Ethernet controller chip or a network processor unit (NPU).

In the illustrated embodiment, processor/controller 704 includes an instruction store 710, a cluster of processor engines 712, an SRAM controller 714, a DRAM controller 716, a Write DMA block 718, a Read DMA block 720, a PCIe interface 722, a scratch memory 724, a hash unit 726, Serializer/Deserializers (SerDes) 728 and 730, and PHY interfaces 732 and 734. Each of the components is interconnected to one or more other components via applicable interconnect structure and logic that is collectively depicted as an internal interconnect cloud 735.

Instruction store 710 includes various instructions that are executed by processor engines cluster 712, including Flow Classification instructions 713, PC logic instructions 715, PC open flow criteria functions 717, and PC closed flow criteria functions 719. Processor engines cluster 712 includes a plurality of microengines 736, each coupled to a local control store 737. Under one embodiment, various operations such as packet identification and flow classification are performed using a pipelined architecture, such as illustrated in FIG. 7, with each microengine performing an associated operation in the pipeline. As an alternative, processor engines cluster 736 is representative of one or more processor cores in a central processing unit or controller. As yet another option, the combination of processor engines 712 and instruction store 710 may be implemented as embedded logic, such as via using an ASIC or Field Programmable Gate Arrays (FPGAs) or the like.

In one embodiment, instruction store 710 is implemented as an on-chip store, such as depicted in FIG. 7. Optionally, a portion or all of the instructions depicted in instruction store 710 may be stored in SRAM 708 and accessed using SRAM controller 714 via an interface 738. SRAM 708 may also be used for storing selected data and/or instructions relating to packet processing operations, such as PC open profile bitmap 202 and PC close profile bitmap 302, as well as caches flow table entries and the like.

DRAM 706 is used to store receive buffers and queues 707 and transmit buffers and queues 709, and is accessed using DRAM controller 716 via an interface 740. Write DMA block 718 and Read DMA block 720 are respectively configured to support DMA Write and Read operations in accordance with the embodiments described herein. In the illustrated embodiment, DMA communication between DRAM 706 and a platform host circuitry is facilitated over PCIe interface 722 via a PCIe link 742 coupled to a PCIe interconnect or PCIe expansion slot 744, enabling DMA Write and Read transfers between DRAM 706 and system memory for a host 746 using the PCIe protocol.

In addition to PCIe, other interconnect technologies and protocols may be used. For example, these include but are not limited to Computer Express Link (CXL), InfiniBand, and Omni-Path.

Scratch memory 724 and hash unit 726 are illustrative of components employed by NICs for facilitating scratch memory and hashing operations relating to packet processing. For example, as described above a hash operation may be implemented for deriving flow IDs and for packet identification.

PHYs 732 and 734 facilitate Physical layer operations for the NIC, and operate as a bridge between the digital domain employed by the NIC logic and components and the analog domain employed for transmitting data via electrical, optical or wired signals. For example, in the illustrated embodiment of FIG. 7, each of PHYs 732 and 734 is coupled to a pair of I/O ports configured to send electrical signals over a wire cable such as a Cat6e or Cat6 Ethernet cable. Optical and wireless signal embodiments would employ additional circuitry and interfaces for facilitating connection via optical and wireless signals (not shown). In conjunction with PHY operations, SerDes 728 and 730 are used to serialize output packet streams and deserialize inbound packet streams.

In addition to the instructions shown in instruction store 710, other instructions may be implemented via execution of processor engines 712 or other processing means to facilitate additional operations. For example, in one embodiment, NIC 700 is configured to implement a TCP/IP stack on the NIC itself. NIC 700 may also be configured to facilitate TCP operations in a manner that is offloaded from the Operating System TCP facilities, whereby once a packet is sent outbound, NIC 700 is responsible for processing an ACK message and resending the packet if an ACK message is not received within an applicable TCP timeout value.

Generally, a NIC may be configured to store routing data for facilitating packet identification and flow classification, including forwarding filters and rules either locally or using MMIO address space in system or host memory. When stored locally, this routing data may be stored in either DRAM 706 or SRAM 708. Routing/forwarding filters, rules, data, etc. stored in a MMIO address space may be written by a host to NIC 700 via Write DMA operations. Generally, setting up MMIO address space mapping may be facilitated by a NIC device driver in coordination with the operating system. The NIC device driver may also be configured to enable instructions in instruction store 710 to be updated via the operating system. Optionally, the instructions in instruction store may comprise firmware instructions that are stored in non-volatile memory, such as Flash memory, which may either be integrated on processor/controller 704 or mounted to NIC system board 702 (not shown).

In one embodiment, the PC open criteria functions and PC close criteria instructions are implemented in an accelerator rather than the NIC or network interface. In one embodiment, the accelerator is implemented in a daughterboard or module that is attached to the NIC or network interface. In another embodiment, the accelerator is implemented in an accelerator card or board that installed in a separate PCIe expansion slot and communication between the NIC/network interface and the accelerator card or board is over PCIe.

Figure 8A:
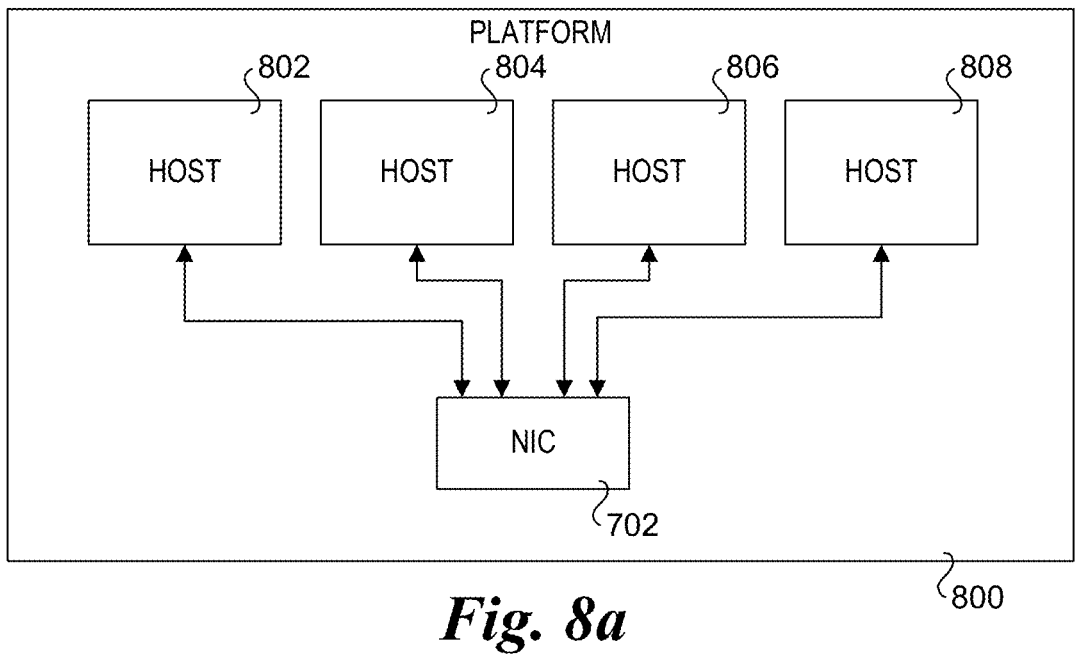
FIG. 8a is a schematic diagram illustrating a NIC coupled to a plurality of hosts in a platform.

In addition to a network controller or NIC being connected to a single host, the network controller or NIC may be connected to multiple hosts. For example, FIG. 8*a* shows a platform 800 including a NIC 702 connected to each of hosts 802, 804, 806, and 808. In one embodiment, when connected to multiple hosts, NIC 702 includes a separate set of interrupt vector pool configuration tables for each host.

Figure 8B:
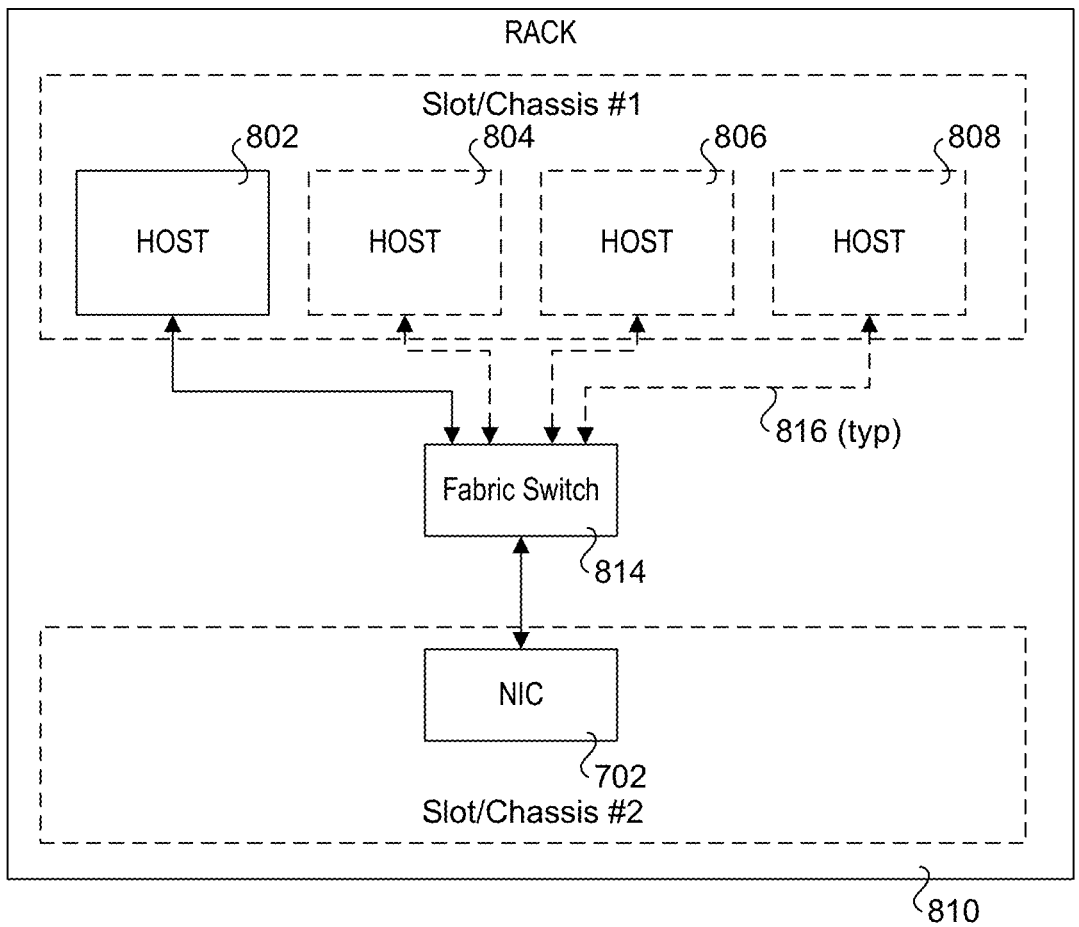
FIG. 8b is a schematic diagram illustrating a NIC in a first slot or chassis of a rack coupled in communication with one or more hosts in a second slot or chassis of the rack via a fabric.

As shown in FIG. 8*b*, a NIC can be installed in a rack in a slot, chassis, tray or sled that is separate from a slot, chassis, tray or sled in which one or more hosts connected to the NIC are installed. In this example, NIC 702 is installed in a slot or chassis #2 in a rack 810 including multiple slots. One or more hosts 802, 804, 806, and 808 are installed in a slot or chassis #1. NIC 702 is coupled in communication with one or more of hosts 802, 804, 806, and 808 via a fabric switch 814 and fabric links 816. In other embodiments, a NIC may be coupled in communication with a host in a separate slot or chassis via a point-to-point link. In still other embodiments, a NIC may be coupled in communication with a host in a separate rack (not shown).

Figure 9:
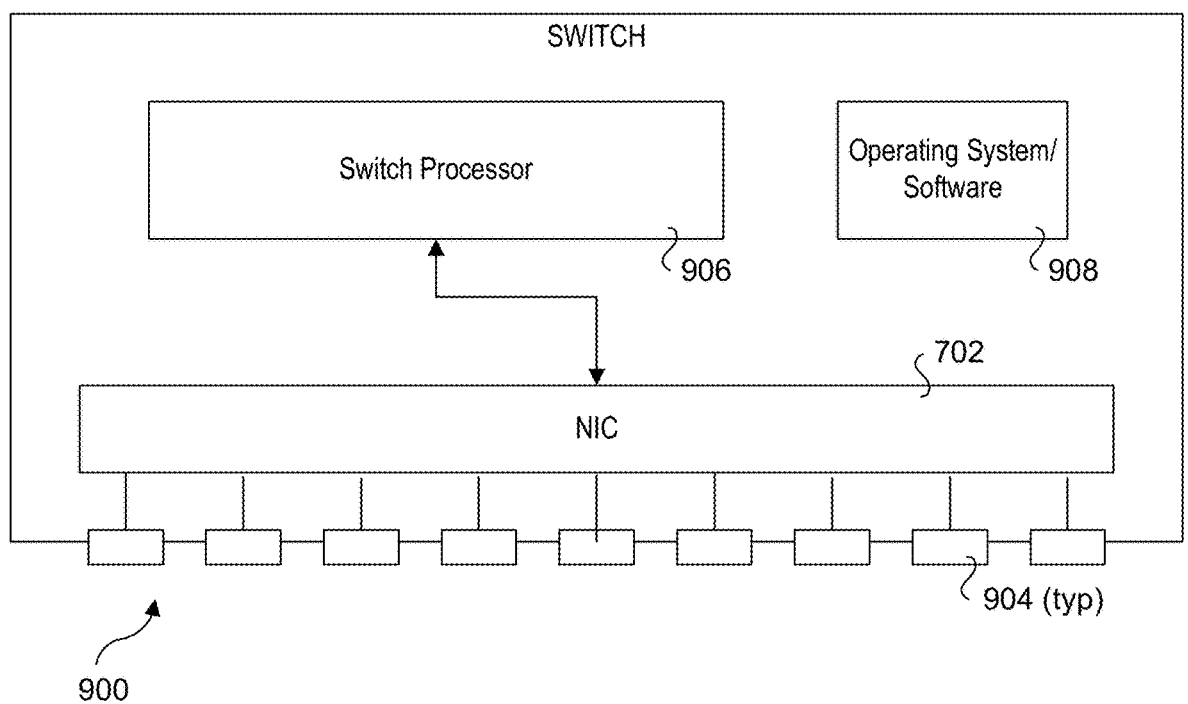
FIG. 9 is a schematic diagram illustrating implementation of a NIC in a switch.

The teachings and principles disclosed herein may also be implemented in a switch. For example, FIG. 9 shows a switch 900 including a NIC 702 connected to multiple switch ports 904 and to a switch processor 906. An operating system or other software 908 is executed on switch processor 906 to effect operations similar to those performed by the OS kernel protocol stack (or other operating system components) in the embodiments described above.

Generally, the hardware-offload packet coalescing schemes disclosed herein may be applied to various packet coalescing schemes that are currently implemented in software, including but not limited to receive side coalescing, receive segment coalescing (both referred to as RSC), large send offload (LSO), and generic segment offload (GSO).

In general, the circuitry, logic and components depicted in the figures herein may be implemented in various types of integrated circuits (e.g., semiconductor chips) and modules, including discrete chips, SoCs, multi-chip modules, and networking/link interface chips including support for multiple network interfaces. Also, as used herein, circuitry and logic to effect various operations may be implemented via one or more of embedded logic, embedded processors, controllers, microengines, or otherwise using any combination of hardware, software, and/or firmware. For example, the operations depicted by various logic blocks and/or circuitry may be effected using programmed logic gates and the like, including but not limited to Application Specific Integrated Circuits (ASICs), FPGAs, IP block libraries, or through one or more of software or firmware instructions executed on one or more processing elements including processors, processor cores, controllers, microcontrollers, microengines, etc.

The memory devices described and/or illustrated herein may be embodied as any type of memory device capable of storing data, such as any type of volatile (e.g., DRAM, etc.) or non-volatile memory. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include next-generation nonvolatile devices, such as Intel® 3D XPoint™ memory or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, the memory device may comprise a transistor-less stackable cross point architecture in which memory cells sit at the intersection of word lines and bit lines and are individually addressable and in which bit storage is based on a change in bulk resistance.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'm', 'J', 'M', 'N', 'P', 'Q', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for coalescing packet data from packets received from one or more networks, comprising:
    storing a plurality of packet coalescing open profiles, each packet coalescing open profile defining a set of packet coalescing open flow criteria from among a plurality of packet coalescing open flow criteria to be applied for that packet coalescing open profile;
    storing a plurality of packet coalescing close profiles, each packet coalescing close profile identifying a set of packet coalescing close flow criteria from among a plurality of packet coalescing close flow criteria to be applied for that packet coalescing close profile;
    enabling packet coalescing for one or more receive queues; and
    for at least one of the receive queues for which packet coalescing is enabled, assigning a packet coalescing open profile and a packet coalescing close profile.

2. The method of claim 1, further comprising:
    storing an open criteria map containing a list of the plurality of packet coalescing open flow criteria;

storing a close criteria map containing a list of the plurality of packet coalescing close flow criteria;

for a packet coalescing open profile,
mapping information in the packet coalescing open profile to the open criteria map to identify the set of packet coalescing open flow criteria to evaluate for that packet coalescing open profile; and for a packet coalescing close profile,
mapping information in the packet coalescing close profile to the close criteria map to identify the set of packet coalescing close flow criteria to evaluate for that packet coalescing close profile.

3. The method of claim 2, wherein the plurality of packet coalescing open profiles are stored in a packet coalescing open profile bitmap data structure and wherein the plurality of packet coalescing close profiles are stored in a packet coalescing close profile bitmap data structure, wherein column indexes in the packet coalescing open profile bitmap data structure are mapped to row indexes in the open criteria map, and wherein column indexes in the packet coalescing close profile bitmap data structure are mapped to row indexes in the close criteria map.

4. The method of claim 1, further comprising:
receiving an Ethernet frame at an input port of the network interface;
extracting a packet from the Ethernet frame;
determining whether the packet is a packet coalescing candidate; and
if the packet is not a packet coalescing candidate, using a non-packet coalescing control path to process the packet.

5. The method of claim 4, wherein the packet is determined to be a packet coalescing candidate, further comprising:
performing flow classification for the packet;
buffering the packet in a first receive queue for which a first packet coalescing open flow profile is assigned;
performing a packet coalescing flow lookup to determine if the packet matches an open packet coalescing flow; and
if the packet does not match an open packet coalescing flow, determining whether to open a new packet coalescing flow for the packet by applying the packet coalescing open flow criteria defined by the first packet coalescing open profile to the packet.

6. The method of claim 5, wherein the network interface is coupled to a host, further comprising:
if it is determined that a new packet coalescing flow is to be opened, delivering the packet to the host as a first packet in the new packet coalescing flow; otherwise,
delivering the packet to the host as a non-packet coalescing packet.

7. The method of claim 4, wherein the packet is determined to be a packet coalescing candidate, further comprising:
performing flow classification for the packet;
buffering the packet in a first receive queue for which a first packet coalescing close flow profile is assigned;
performing a packet coalescing flow lookup to determine if the packet matches an open packet coalescing flow;
determining the packet belongs to an open packet coalescing flow; and
determining whether to close the open packet coalescing flow by applying the packet coalescing close flow criteria defined by the first packet coalescing close profile to the packet.

8. The method of claim 7, wherein the network interface is coupled to a host, further comprising:
if it is determined that the open packet coalescing flow is to be closed, delivering the packet to the host as a last packet in the open packet coalescing flow and closing the open packet coalescing flow; otherwise,
delivering the packet to the host as a middle packet in the packet coalescing flow.

9. The method of claim 1, wherein the method is implemented on a host platform in which the network interface is installed and having a plurality of virtual machines or containers in which respective operating system instances are run, further comprising:
implementing a respective packet coalescing-enabled receive queue on the network interface for each of at least two operating system instances; and
assigning different packet coalescing open profiles and packet coalescing close profiles for the respective packet coalescing-enabled receive queues.

10. The method of claim 1, further comprising:
enabling at least one of,
one or more of the plurality of packet coalescing open profiles stored on the network interface to be updated or a new packet coalescing open profile to be added; and
one or more of the plurality of packet coalescing close profiles stored on the network interface to be updated or a new packet coalescing close profile to be added.

11. An apparatus configured to be installed in a computer platform including a host processor and host memory, the apparatus comprising:
one or more ports configured to receive packets from one or more networks;
an input/output (I/O) interface to facilitate communication between the computer platform and the apparatus when the apparatus is installed in the computer platform and operating;
memory; and
circuitry configured to,
store a plurality of packet coalescing open profiles in the memory, each packet coalescing open profile defining a set of packet coalescing open flow criteria from among a plurality of packet coalescing open flow criteria to be applied for that packet coalescing open profile;
store a plurality of packet coalescing close profiles in the memory, each packet coalescing close profile identifying a set of packet coalescing close flow criteria from among a plurality of packet coalescing close flow criteria to be applied for that packet coalescing close profile;
enable packet coalescing for at least one receive queue; and
for at least one of the at least one receive queue for which packet coalescing is enabled,
associate a packet coalescing open profile and packet coalescing close profile with the receive queue;
configure the set of packet coalescing open flow criteria defined for the packet coalescing open profile associated with the receive queue to be used to determine whether to open a packet coalescing flow; and
configure the set of packet coalescing close flow criteria defined for the packet coalescing close profile associated with the receive queue to be used to determine whether to close a packet coalescing flow.

12. The apparatus of claim 11, wherein the circuitry is further configured to:
- store an open criteria map containing a list of the plurality of packet coalescing open flow criteria for which the circuitry is configured to evaluate;
- store a close criteria map containing a list of the plurality of packet coalescing close flow criteria for which the circuitry is configured to evaluate;
- for a packet coalescing open profile,
  - map information in the packet coalescing open profile to the open criteria map to identify the set of packet coalescing open flow criteria to evaluate for that packet coalescing open profile; and
- for a packet coalescing close profile,
  - map information in the packet coalescing close profile to the close criteria map to identify the set of packet coalescing close flow criteria to evaluate for that packet coalescing close profile.

13. The apparatus of claim 11, wherein the plurality of packet coalescing open profiles are stored in a packet coalescing open profile bitmap data structure and wherein the plurality of packet coalescing close profiles are stored in a packet coalescing close profile bitmap data structure, wherein column indexes in the packet coalescing open profile bitmap data structure are mapped to row indexes in the open criteria map, and wherein column indexes in the packet coalescing close profile bitmap data structure are mapped to row indexes in the close criteria map.

14. The apparatus of claim 11, wherein the circuitry is further configured to:
- receive an Ethernet frame at an input port;
- extract a packet from the Ethernet frame;
- determine whether the packet is a packet coalescing candidate; and
- if the packet is not a packet coalescing candidate, use a non-packet coalescing control path to process the packet.

15. The apparatus of claim 14, wherein the packet is determined to be a packet coalescing candidate, and wherein the circuitry is further configured to:
- perform flow classification for the packet;
- buffer the packet in a first receive queue for which a first packet coalescing open flow profile is assigned;
- perform a packet coalescing flow lookup to determine if the packet matches an open packet coalescing flow; and
- if the packet does not match an open packet coalescing flow, determine whether to open a new packet coalescing flow for the packet by evaluating the set of packet coalescing open flow criteria defined by the first packet coalescing open profile using information associated with the packet.

16. The apparatus of claim 15, wherein the circuitry is further configured to:
- if it is determined that a new packet coalescing flow is to be opened, deliver the packet to the host memory as a first packet in the new packet coalescing flow; otherwise,
- deliver the packet to the host memory as a non-packet coalescing packet.

17. The apparatus of claim 14, wherein the packet is determined to be a packet coalescing candidate, and wherein the circuitry is further configured to:
- perform flow classification for the packet;
- buffer the packet in a first receive queue for which a first packet coalescing close flow profile is assigned;
- perform a packet coalescing flow lookup to determine if the packet matches an open packet coalescing flow;
- determine the packet belongs to an open packet coalescing flow; and
- determine whether to close the open packet coalescing flow by evaluating the set of packet coalescing closed flow criteria defined by the first packet coalescing close profile using information associated with the packet.

18. The apparatus of claim 17, wherein the circuitry is further configured to:
- if it is determined that the open packet coalescing flow is to be closed, deliver the packet to the host memory as a last packet in the open packet coalescing flow and close the open packet coalescing flow; otherwise,
- deliver the packet to the host memory as a middle packet in the packet coalescing flow.

19. The apparatus of claim 11, wherein the computer platform hosts a plurality of virtual machines or containers in which respective operating system instances are run, and wherein the circuitry is further configured to:
- implement a respective packet coalescing-enabled receive queue in the memory for each of at least two operating system instances; and
- implement different packet coalescing open profiles and packet coalescing close profiles for the respective packet coalescing-enabled receive queues.

20. The apparatus of claim 11, wherein the circuitry is further configured to: enable at least one of,
- one or more of the plurality of packet coalescing open profiles to be updated or a new packet coalescing open profile to be added; and
- one or more of the plurality of packet coalescing close profiles stored to be updated or a new packet coalescing close profile to be added.

21. The apparatus of claim 11, wherein the circuitry is further configured to:
- evaluate each of the plurality of packet coalescing open flow criteria; and
- evaluate each of the plurality of packet coalescing close flow criteria.

22. A computer platform, comprising:
- a host processor including a plurality of cores;
- host memory, communicatively coupled to the processor,
- one or more storage devices in which software instructions are stored; and
- a network interface device, communicatively coupled to the host processor via an input/output (I/O) interface and including,
  - one or more ports configured to receive packets from one or more networks;
  - memory; and
  - circuitry configured to,
    - store a plurality of packet coalescing open profiles in the memory, each packet coalescing open profile defining a set of packet coalescing open flow criteria from among a plurality of packet coalescing open flow criteria to be applied for that packet coalescing open profile;
    - store a plurality of packet coalescing close profiles in the memory, each packet coalescing close profile identifying a set of packet coalescing close flow criteria from among a plurality of packet coalescing close flow criteria to be applied for that packet coalescing close profile;
    - enable packet coalescing for at least one receive queue; and
    - for at least one of the at least one receive queue for which packet coalescing is enabled, associate a packet coalescing open profile and packet coalescing close profile with the receive queue;

configure the set of packet coalescing open flow criteria defined for the packet coalescing open profile associated with the receive queue to be used to determine whether to open a packet coalescing flow; and configure the set of packet coalescing close flow criteria defined for the packet coalescing close profile associated with the receive queue to be used to determine whether to close a packet coalescing flow.

23. The computer platform of claim 22, wherein a portion of a memory space of the memory on the network interface is implemented as Memory-Mapped Input/Output (MMIO) memory space in which the plurality of packet coalescing open profiles and the plurality of packet coalescing close profiles are to be stored, and wherein execution of the software instructions on the host processor enable the host processor to write the plurality of packet coalescing open profiled into the MMIO memory space and write the plurality of packet coalescing close profiles into the MMIO memory space.

24. The computer platform of claim 22, wherein the circuitry on the network interface device is further configured to:

store an open criteria map containing a list of the plurality of packet coalescing open flow criteria for which the circuitry is configured to evaluate;

store a close criteria map containing a list of the plurality of packet coalescing close flow criteria for which the circuitry is configured to evaluate;

for a packet coalescing open profile,
map information in the packet coalescing open profile to the open criteria map to identify the set of packet coalescing open flow criteria to evaluate for that packet coalescing open profile; and for a packet coalescing close profile,
map information in the packet coalescing close profile to the close criteria map to identify the set of packet coalescing close flow criteria to evaluate for that packet coalescing close profile.

25. The computer platform of claim 22, wherein the circuitry on the network interface is further configured to:

implement a packet coalescing-enable queue having an associated packet coalescing open profile and an associated packet coalescing close profile buffer TCP/IP (Transmission Control Protocol/Internet Protocol) packets extracted from Ethernet frames received at an input port from a network in the packet coalescing-enabled receive queue; and coalesce TCP segments extracted from the TCP/IP packets into coalesced packets, by
employing the set of packet coalescing open flow criteria defined by the packet coalescing open profile to open a packet coalescing context associated with a buffer space comprising one or more buffers in host memory in which coalesced TCP segments extracted from TCP/IP packets are to be written; and
employing the set of packet coalescing close flow criteria defined by the packet coalescing close profile to determine when to close the packet coalescing context.

26. The computer platform of claim 22, wherein execution of the software instructions on the host processor enable the computer platform to hosts a plurality of virtual machines or containers in which respective operating system instances are run, and wherein the circuitry on the network interface is further configured to:

implement a respective packet coalescing-enabled receive queue in memory on the network interface for each of at least two different operating system instances; and implement different packet coalescing open profiles and packet coalescing close profiles for the respective packet coalescing-enabled receive queues.

27. The computer platform of claim 22, wherein the at least two different operating system instances include at least two different operating systems from among a group of operating systems including a Microsoft Windows operating system, an HP-UX operating system, a Linux operating system, and a UNIX operating system.

28. A non-transitory computer-readable medium having instructions stored thereon configured to be executed on a host processor of a computer platform including host memory and a network interface, communicatively coupled to the host processor via an input/output (I/O) interface and including one or more ports configured to receive packets from one or more networks and memory, wherein, upon execution of the instructions the computer platform is enabled to:

configure a plurality of packet coalescing open profiles in the network interface memory, each packet coalescing open profile defining a set of packet coalescing open flow criteria from among a plurality of packet coalescing open flow criteria the network interface is configured to evaluate;

configure a plurality of packet coalescing close profiles in the network interface memory, each packet coalescing close profile identifying a set of packet coalescing close flow criteria from among a plurality of packet coalescing close flow criteria the network interface is configured to evaluate;

configure the network interface to enable packet coalescing for one or more receive queues; and for each of the receive queues for which packet coalescing is enabled, configuring the network interface to associate a packet coalescing open profile and a packet coalescing close profile for that receive queue.

29. The non-transitory computer readable medium of claim 28, wherein execution of the instructions further enables the computer platform to:

configure an open criteria map in the network interface memory containing a list of the plurality of packet coalescing open flow criteria the network interface is configured to evaluate;

configure a close criteria map in the network interface memory containing a list of the plurality of packet coalescing close flow criteria the network interface is configured to evaluate;

for a packet coalescing open profile,
configure the network interface to map information in the packet coalescing open profile to the open criteria map to identify the set of packet coalescing open flow criteria to evaluate for that packet coalescing open profile; and for a packet coalescing close profile,
configure the network interface to map information in the packet coalescing close profile to the close criteria map to identify the set of packet coalescing close flow criteria to evaluate for that packet coalescing close profile.

30. The non-transitory computer readable medium of claim 29, wherein the plurality of packet coalescing open profiles are stored in a packet coalescing open profile bitmap data structure in the network interface memory and wherein the plurality of packet coalescing close profiles are stored in a packet coalescing close profile bitmap data structure in the network interface memory, wherein column indexes in the packet coalescing open profile bitmap data structure are mapped to row indexes in the open criteria map, and wherein column indexes in the packet coalescing close profile bitmap data structure are mapped to row indexes in the close criteria map.

* * * * *